United States Patent [19]

Kaplan

[11] Patent Number: 4,776,653
[45] Date of Patent: Oct. 11, 1988

[54] AMUSEMENT DEVICE WITH KALEIDOSCOPE VIEWER

[75] Inventor: Deborah S. Kaplan, Fo Tan, Shatin, Hong Kong

[73] Assignee: The Merton Company, Ltd., Hong Kong

[21] Appl. No.: 109,470

[22] Filed: Oct. 16, 1987

[51] Int. Cl.⁴ .............................................. G02B 23/00
[52] U.S. Cl. ..................................................... 350/4.1
[58] Field of Search ........................ 350/4.1, 4.2; 353/1, 353/2; 40/455, 427

[56] References Cited

U.S. PATENT DOCUMENTS

| 754,143 | 3/1904 | Johnson | 350/4.2 |
| 1,835,876 | 12/1931 | Jenkins | 350/4.1 X |
| 3,096,681 | 7/1963 | Burnside, III | 350/4.1 |
| 3,953,104 | 4/1976 | Roitz et al. | 350/4.1 |
| 4,214,808 | 7/1980 | Hampson | 350/4.1 |

Primary Examiner—Richard A. Wintercorn
Attorney, Agent, or Firm—Ostrolenk, Faber, Gerb & Soffen

[57] ABSTRACT

Objects that can be seen through a kaleidoscope viewing tube of an amusement device have a sufficient dimension parallel to the tube to be also viewable from a vantage point orthogonal to the tube. Movement of the objects may be accompanied by music, or other sounds, to increase the amusement value of the device.

12 Claims, 2 Drawing Sheets

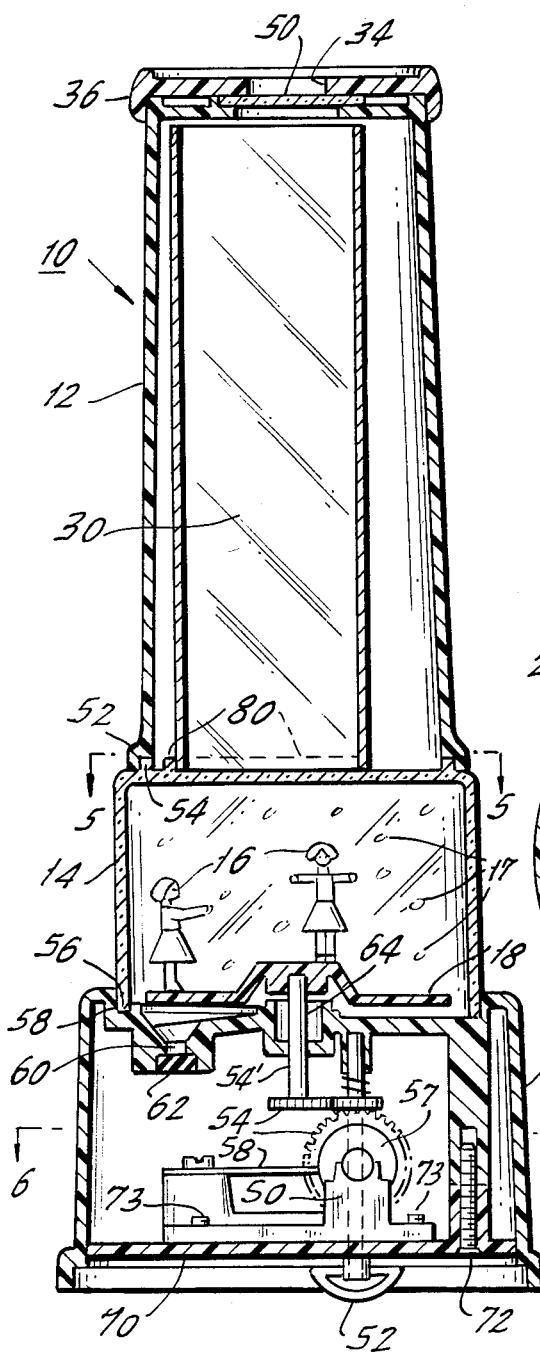

AMUSEMENT DEVICE WITH KALEIDOSCOPE VIEWER

BACKGROUND OF THE INVENTION

The present invention relates to an amusement device including a kaleidoscope viewing tube, and more particularly to such a device including movable figurines which can be seen through the kaleidoscope viewing tube and also from a vantage point orthogonal to the viewing tube.

Various forms of amusement devices with kaleidoscopic viewers are known. Such devices typically include a viewing tube containing mirrors arranged to produce a kaleidoscopic image at one tube end of moving particles at the other tube end. Such particles are usually hidden from view, except through the viewing tube, and have a sufficiently small dimension parallel to the tube that they would be difficult to view from a vantage point orthogonal to the viewing tube.

SUMMARY AND OBJECTS OF THE INVENTION

An object of the invention, therefore, is to provide an amusement device incorporating a kaleidoscope viewer and including objects which are movable in a plane orthogonal to a viewing tube, are viewable through the viewer, and have a sufficient dimension parallel to the tube to be also viewable from a vantage point orthogonal to the tube.

A further object of the invention is to provide an amusement device incorporating a kaleidoscope viewer and including a sound generator to produce musical or other sounds to accompany the moving of objects whose kaleidoscopic image is produced.

The foregoing objects may be realized in an amusement device with a kaleidoscope viewer in accordance with the invention, which includes, in preferred form, a viewing tube with internal mirrors for reflecting an image received at a first tube end and producing a kaleidoscopic image at a second tube end. The device includes a partially transparent housing affixed to the second end of the viewing tube and containing objects arranged to move in a plane orthogonal to the viewing tube. The objects have a sufficient dimension parallel to the tube so that they are also viewable through a transparent part of the housing from a vantage point orthogonal to the tube. Means are provided for moving the objects, preferably comprising a motor-driven turntable for rotating the objects.

The amusement device preferably further includes a means to produce sounds to accompany movement of the objects. Such sound producing means may conveniently be driven by the motor.

BRIEF DESCRIPTION OF THE DRAWINGS

The above objects as well as other objects of this invention shall become readily apparent after reading the following description of the accompanying drawings in which:

FIG. 3 is a typical kaleidoscopic image produced by the amusement device of the invention.

FIG. 4 is an enlarged cross section of the device of FIG. 1 taken at arrows 4—4 in FIG. 1.

FIG. 5 is a cross section of the device of FIG. 4 taken at arrows 5—5 in FIG. 4.

FIG. 6 is a cross section of the device of FIG. 4 taken at arrows 6—6 in FIG. 4.

DESCRIPTION OF THE PREFERRED EMBODIMENTS

Figure 1:
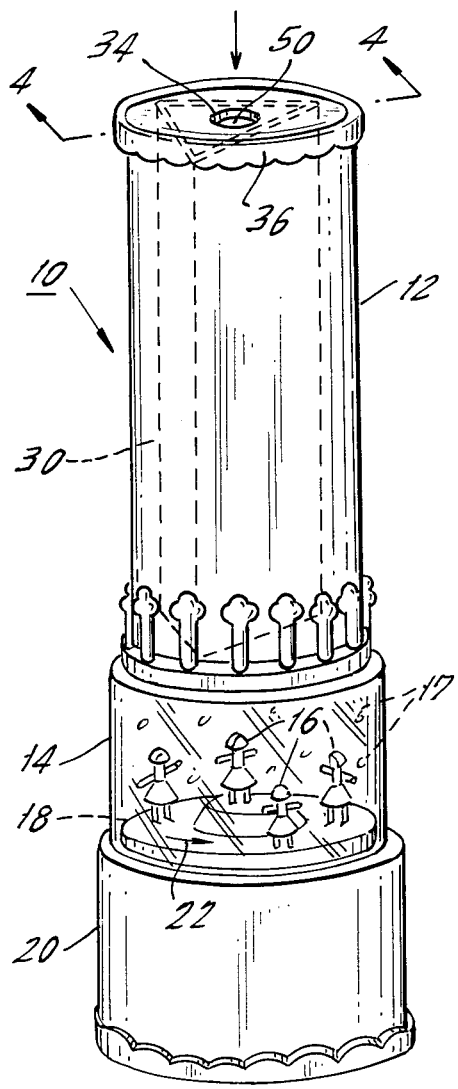
FIG. 1 is a perspective view of an amusement device with a kaleidoscope viewer in accordance with the invention.

FIG. 1 is a perspective view of an amusement device 10 with a kaleidoscope viewer in accordance with the invention. Device 10 includes: a viewing tube 12, a transparent housing 14, figurines 16 within housing 14, a turntable 18 on which the figurines are mounted, and a base 20. Turntable 18 is driven by a motor (not shown) within base 20. Enclosure 14 is preferably filled with liquid, such as water, and may contain loose particles 17 resembling snow, for example.

When turntable 18 rotates in the direction shown by arrow 22, for example, figurines 16 are moved in a plane orthogonal to viewing tube 12. Figurines 16 have a sufficient vertical direction in FIG. 1 that they are normally viewable along the plane in which such figurines rotate. Figurines 16 may also be moved up and down, for example, if desired.

Figure 2:
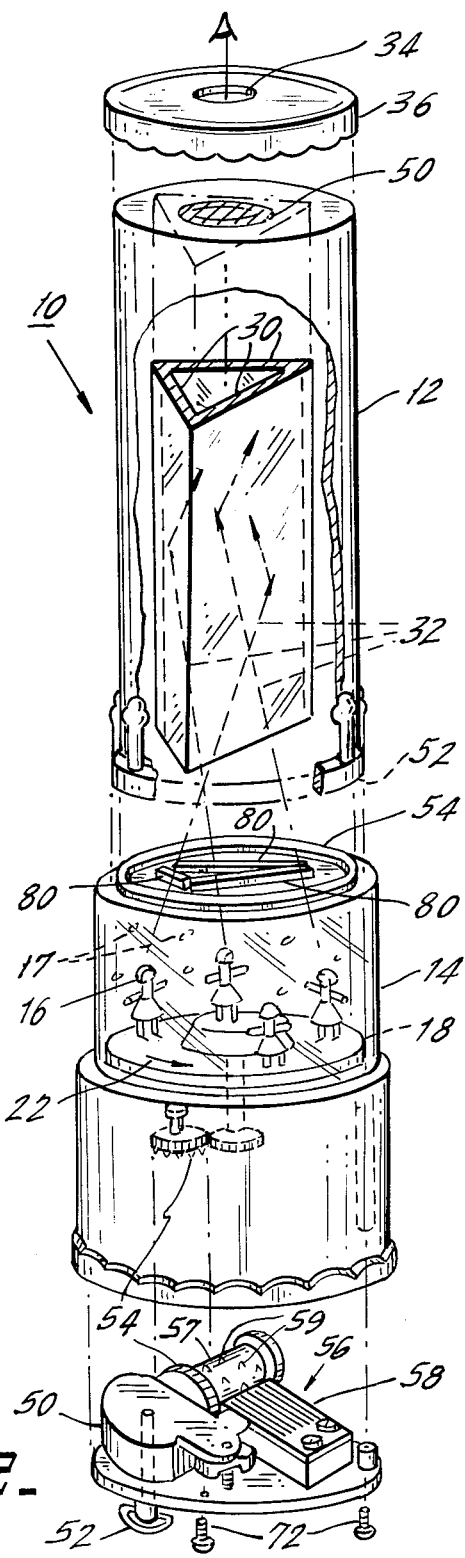
FIG. 2 is an exploded perspective view of the amusement device of the invention, with a portion of a viewing tube cutaway to show mirrors used in the tube.

Amusement device 10 is described in more detail in the exploded, partially cutaway view of FIG. 2. Viewing tube 12 can be seen to include a set of three rectangular mirrors 30 arranged to form a tube of equilaterally triangular cross section. An image of figurines 16 received at the lower end of mirrors 30, on the inner surfaces of such mirrors, is reflected upwardly within the tube of mirrors, as shown by reflection lines 32, to produce a kaleidoscopic image of figurines 16, which is viewable through aperture 34 in top piece 36. To produce a desirable kaleidoscopic image, each of mirrors 30 may be approximately 3.5×10.5 cm in rectangular dimension, and figurines 16 may extend from about 0.5 cm to about 2.5 cm below the bottom of mirrors 30. Such image preferably includes, as shown in FIG. 3, an unaltered triangular view 40 and three other triangular views 50 reflected only once and adjoining respective sides of triangular view 40. The views 40 and 50 may all have equilateral triangle boundaries.

FIG. 2 also shows a spring-type motor 50 including a windup key 52, a gear assembly 54 for driving turntable 18, and a music generator 56 driven by motor 50. Music generator 56 includes a revolving drum 57 and metal prongs 58 which are plucked by bumps 59 on drum 57 to create sounds.

FIG. 4 shows additional details of amusement device 10 of the invention. FIG. 4 shows a transparent viewing lens 50 received between the upper, flanged end of viewing tube 12 and top piece 36. FIG. 4 shows the bottom end of viewing tube 12 as skirted at 52 to receive upward ridge 54 of housing 14. The lower cylindrical end 56 of housing 14 may be received within cooperating groove 58 of base member 20. Liquid may be injected into housing 14 through port 60 in base member 20, and a rubber plug 62 may seal port 60. A watertight bearing 64 prevents fluid in housing 14 from leaking into base member 20 in the vicinity of a shaft 54' used to rotate turntable 18.

A bottom plate 70 may be secured to the underside of base member 20 via machine screw 72, for example.

Motor 50 and music generator 57, 58 may be mounted via screws 73 to bottom plate 70.

As the crosshatching in FIG. 4 shows, parts 12, 16, 18, 20, 36 and 70 may be formed of colored plastic, parts 14 and 50 of transparent plastic, and mirrors 30 of metal.

FIG. 5 shows three upward ridges 80 atop housing 14 for holding mirrors 30 in alignment. The triangular tube formed by mirrors 30 lies just inside a triangular border formed by ridges 80. FIG. 5 also shows a portion of skirt 52 surrounding upward ridge 54, to join tube 12 to housing 14.

FIG. 6 shows an upper plan view of motor 50, gear drive 54, and music generator 57, 58.

The foregoing describes an amusement device incorporating a kaleidoscope viewing tube and including movable objects such as figurines. The objects can be seen through the kaleidoscope viewing tube as well as from a vantage point orthogonal to such viewing tube. Movement of the objects may be accompanied by music or other sounds.

Although the present invention has been described on connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. An amusement device with a kaleidoscope viewer, comprising:
    a viewing tube including internal mirrors for reflecting an image received at a first tube end and producing a kaleidoscopic image at a second tube end;
    a housing affixed to the second end of the viewing tube, being at least partially transparent, and containing objects arranged to move in a plane orthogonal to the viewing tube, such objects having a sufficient dimension parallel to the tube to be also viewable through a transparent part of the housing from a vantage point orthogonal to the tube; and
    means for moving the objects in such orthogonal plane.

2. The amusement device of claim 1, wherein the means for moving the objects comprises a motor and wherein the amusement device further comprises means to generate sound, such means being driven by the motor.

3. The amusement device of claim 2, wherein the motor comprises a spring-type motor.

4. The amusement device of claim 1, wherein the objects comprise figurines.

5. The amusement device of claim 1, wherein the means for moving the objects comprises a turntable and a motor to drive the turntable.

6. The amusement device of claim 1, wherein the housing contains liquid.

7. The amusement device of claim 6, wherein the housing further contains loose particles in the liquid.

8. The amusement device of claim 1, wherein the internal mirrors comprise three rectangular mirrors arranged to form a tube with triangular cross section.

9. The amusement device of claim 8, wherein the triangular cross section is equilateral.

10. The amusement device of claim 8, wherein each mirror is dimensioned to have a length about triple that of its width.

11. The amusement device of claim 8, wherein the mirrors are dimensioned with respect to objects being viewed to produce a kaleidoscopic image of a triangular non-reflected image surrounded by three triangular once-reflected images.

12. The amusement device of claim 11, wherein all triangular images are equilateral.

* * * * *

UNITED STATES PATENT AND TRADEMARK OFFICE
CERTIFICATE OF CORRECTION

PATENT NO. : 4,776,653

DATED : October 11, 1988

INVENTOR(S) : Deborah S. Kaplan

It is certified that error appears in the above-identified patent and that said Letters Patent is hereby corrected as shown below:

Column 3, line 34, change "second" to --first--.

Signed and Sealed this

Sixteenth Day of November, 1993

*Attest:*

BRUCE LEHMAN

*Attesting Officer*     *Commissioner of Patents and Trademarks*